(12) United States Patent
Wobben

(10) Patent No.: US 8,241,002 B2
(45) Date of Patent: *Aug. 14, 2012

(54) ROTOR BLADE FOR A WIND POWER PLANT

(76) Inventor: Aloys Wobben, Aurich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/911,648

(22) Filed: Oct. 25, 2010

(65) Prior Publication Data

US 2011/0158816 A1 Jun. 30, 2011

Related U.S. Application Data

(63) Continuation of application No. 12/268,576, filed on Nov. 11, 2008, now Pat. No. 7,841,836, which is a continuation of application No. 10/541,146, filed as application No. PCT/EP03/14621 on Dec. 19, 2003, now Pat. No. 7,540,716.

(30) Foreign Application Priority Data

Jan. 2, 2003 (DE) .................. 103 00 284
Jan. 31, 2003 (DE) .................. 103 03 824

(51) Int. Cl.
*F03D 11/00* (2006.01)
(52) U.S. Cl. ............... 416/228; 416/235; 416/238
(58) Field of Classification Search ............ 416/228, 416/232, 231 R, 231 B, 235, 236 R, 238, 416/241 B, 243; 244/91, 199.1
See application file for complete search history.

(56) References Cited

U.S. PATENT DOCUMENTS

| | | | |
|---|---|---|---|
| 2,426,742 | A | 9/1947 | Pawlowski |
| 3,171,495 | A | 3/1965 | Puckett |
| 3,411,738 | A | 11/1968 | Sargent |
| 4,093,402 | A | 6/1978 | Van Holten |
| 4,168,939 | A | 9/1979 | Schmitz et al. |
| 4,291,235 | A | 9/1981 | Bergey, Jr. et al. |
| 4,311,434 | A | 1/1982 | Abe |
| 4,324,530 | A | 4/1982 | Fradenburgh et al. |
| 4,329,115 | A | 5/1982 | Kress |

(Continued)

FOREIGN PATENT DOCUMENTS

DE  4030559 A1  4/1992

(Continued)

OTHER PUBLICATIONS

Antoniou, I., et al., "A Theoretical and Experimental Investigation of New Tip Shapes," in Proceedings of the European Community Wind Energy Conference, Germany, Mar. 8-12, 1993, pp. 280-285.

(Continued)

*Primary Examiner* — Ninh H Nguyen
(74) *Attorney, Agent, or Firm* — Seed Intellectual Property Law Group PLLC

(57) ABSTRACT

The present invention concerns a rotor blade for a wind power plant having an aerodynamic profile. The rotor blade has a main rotor body with an aerodynamic profile and a tip. The tip extends away from a plane of the rotor blade and in a direction of at least one of a low pressure side or a high pressure side of the main rotor body. The tip includes a tip upper edge, a tip leading edge, and a tip trailing edge. At least a portion of the tip leading edge is curved such that a width of the tip defined between the tip leading edge and the tip trailing edge is reduced towards the upper edge.

13 Claims, 5 Drawing Sheets

U.S. PATENT DOCUMENTS

| | | | |
|---|---|---|---|
| 4,533,297 | A | 8/1985 | Bassett |
| 4,714,215 | A | 12/1987 | Jupp et al. |
| 4,722,608 | A | 2/1988 | Salzman et al. |
| 4,776,542 | A | 10/1988 | Van Dam |
| 5,215,441 | A | 6/1993 | Evans et al. |
| 5,217,349 | A | 6/1993 | Succi |
| 5,348,253 | A | 9/1994 | Gratzer .......................... 244/91 |
| 5,407,153 | A | 4/1995 | Kirk et al. ..................... 244/199 |
| 5,474,425 | A | 12/1995 | Lawlor |
| 5,525,569 | A | 6/1996 | Chess |
| 5,584,661 | A | 12/1996 | Brooks |
| 6,068,446 | A * | 5/2000 | Tangler et al. ............ 416/223 R |
| 6,116,857 | A | 9/2000 | Splettstoesser et al. |
| 6,142,738 | A | 11/2000 | Toulmay |
| 6,334,705 | B1 | 1/2002 | Weetman |
| 6,345,790 | B1 | 2/2002 | Brix |
| 6,484,968 | B2 * | 11/2002 | Felker .............................. 244/91 |
| 6,517,315 | B2 * | 2/2003 | Belady .......................... 415/221 |
| 6,547,181 | B1 * | 4/2003 | Hoisington et al. ............ 244/46 |
| 6,688,842 | B2 | 2/2004 | Boatner |
| 6,979,179 | B2 | 12/2005 | Moller Larsen |
| 7,540,716 | B2 * | 6/2009 | Wobben ........................ 416/228 |
| 7,841,836 | B2 * | 11/2010 | Wobben ........................ 416/228 |
| 2002/0162917 | A1 * | 11/2002 | Heller et al. ................... 244/199 |
| 2004/0028528 | A1 | 2/2004 | Flemming |

FOREIGN PATENT DOCUMENTS

| | | | |
|---|---|---|---|
| DE | 4136956 | A1 | 5/1993 |
| DE | 4436197 | A1 | 4/1996 |
| DE | 4440744 | A1 | 5/1996 |
| DE | 19614420 | A1 | 10/1997 |
| DE | 19738278 | A1 | 3/1999 |
| DE | 19743694 | A1 | 4/1999 |
| DE | 19963252 | A1 | 7/2001 |
| JP | 04317892 | A | 11/1992 |
| WO | 9603215 | A2 | 2/1996 |
| WO | 9914490 | A1 | 3/1999 |
| WO | 02/47979 | A2 | 6/2002 |

OTHER PUBLICATIONS

Gyatt, G.W. et al., "Development and Testing of Tip Devices for Horizontal Axis Wind Turbines," Final Report AeroVironment, Inc., May 1985, 85 pages.

Imamura, Hiroshi et al, "Numerical Analysis of the Horizontal Axis Wind Turbine with Winglets," JSME International Journal, 1998, pp. 170-176, Series B., vol. 41, No. 1.

Muller, R.H.G. et al., "The Influence of Winglets on Rotor Aerodynamics," Vertica vol. 11, No. 4, Nov. 3, 1987, pp. 601-618.

Muller, R.H.G., "Winglets on Rotor Blades in Forward Flight—A Theoretical and Experimental Investigation," Vertica, vol. 14, No. 1, Nov. 1, 1990, pp. 31-46.

Shimizu, Yukimaru et al., "Power Augmentation Effects of a Horizontal Axis Wind Turbine with a Tip Vane—Part 1: Turbine Performance and Tip Vane Configuration," Journal of Fluids Engineering, 1994, pp. 287-292, vol. 116.

Shimizu, Yukimaru et al., "Power Augmentation Effects of a Horizontal Axis Wind Turbine With a Tip Vane—Part 2: Flow Visualization," Journal of Fluids Engineering, 1994, pp. 293-297, vol. 116.

Shimizu, Y. et al., "Studies on Horizontal Axis Wind Turbines with Tip Attachments," EWEC '90, Conference Proceedings, Madrid, Spain, Sep. 10-14, 1990, 5 pages.

Spere, David A. (editor), "Wind Turbine Technology, Fundamental Concepts of Wind Turbine Engineering," 1994, pp. 302-304, Asme Press.

Van Holten, T., "Concentrator Systems for Wind Energy, with Emphasis on Tip-vanes," Wind Engineering, 1981, 17 pages, vol. 5, No. 1.

Van Holten, T., "Tipvane Research at the Delft University of Technology," Second International Symposium on Wind Energy Systems, Oct. 3-6, 1978, 12 pages, Amsterdam, Netherlands.

Office Action relating to Argentinian Patent Application No. P03 01 04866, retrieved Jun. 5, 2008, 5 pages.

Statement of Grounds and Particulars issued by the Australian Patent Office, relating to Australian Patent Application No. 2003296688 in the name of Aloys Wobben, dated Jul. 30, 2008, 11 pages.

van Bussel, "A Momentum Theory for Winglets on Horizontal Axis VVindturbine Rotors and Some Comparison With Experiments," Fourth IEA Symposium on the Aerodynamics of Wind Turbines, Nov. 19-20, 1990, 19 pages, Rome, Italy.

\* cited by examiner

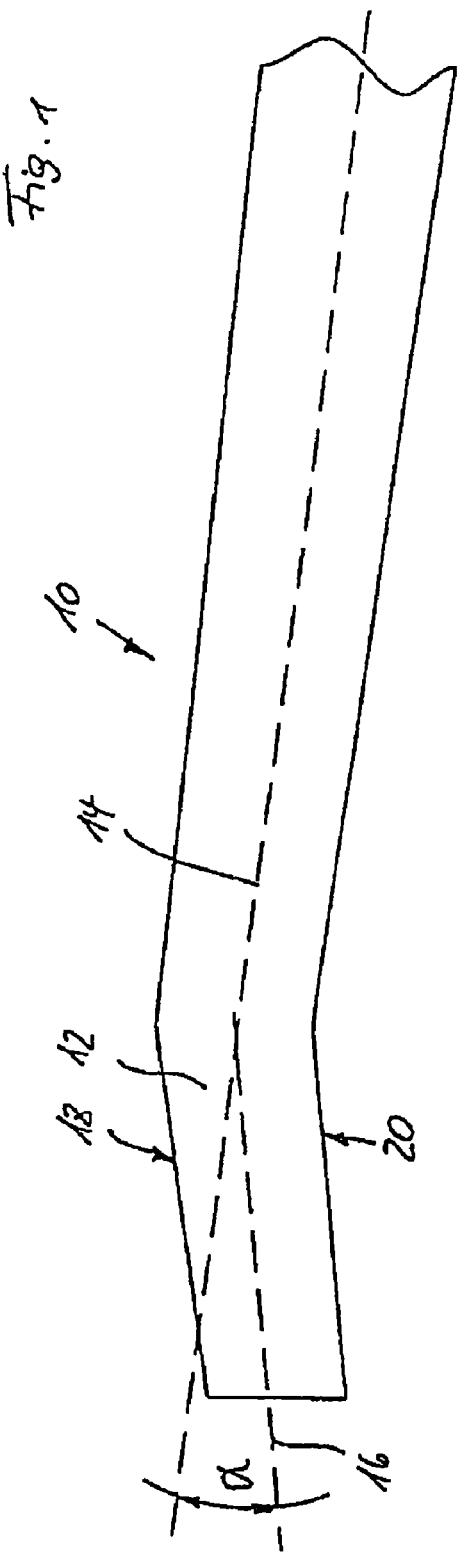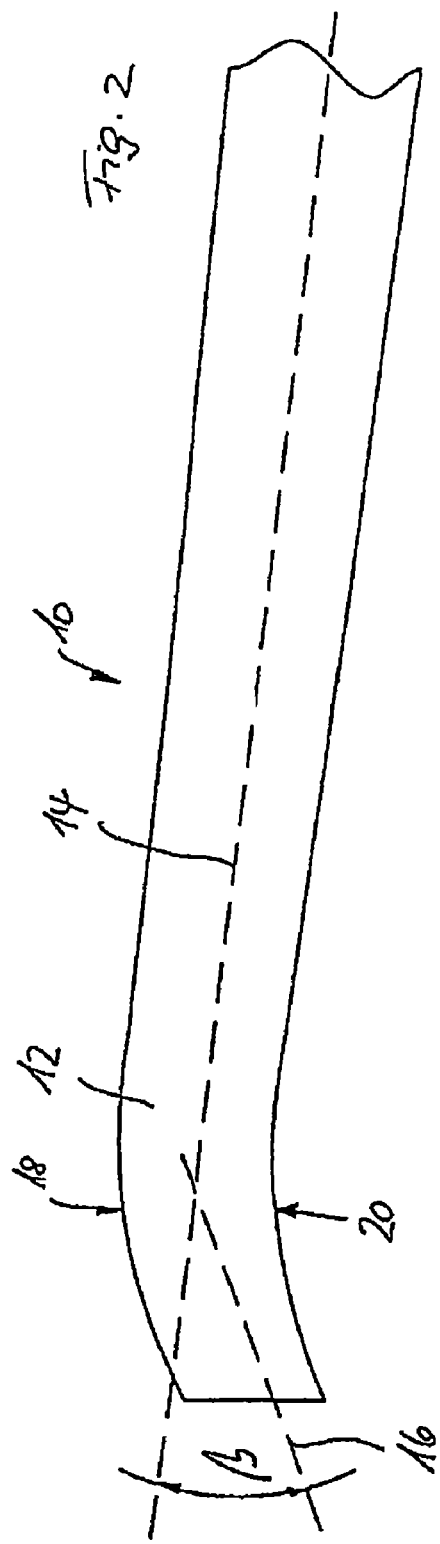

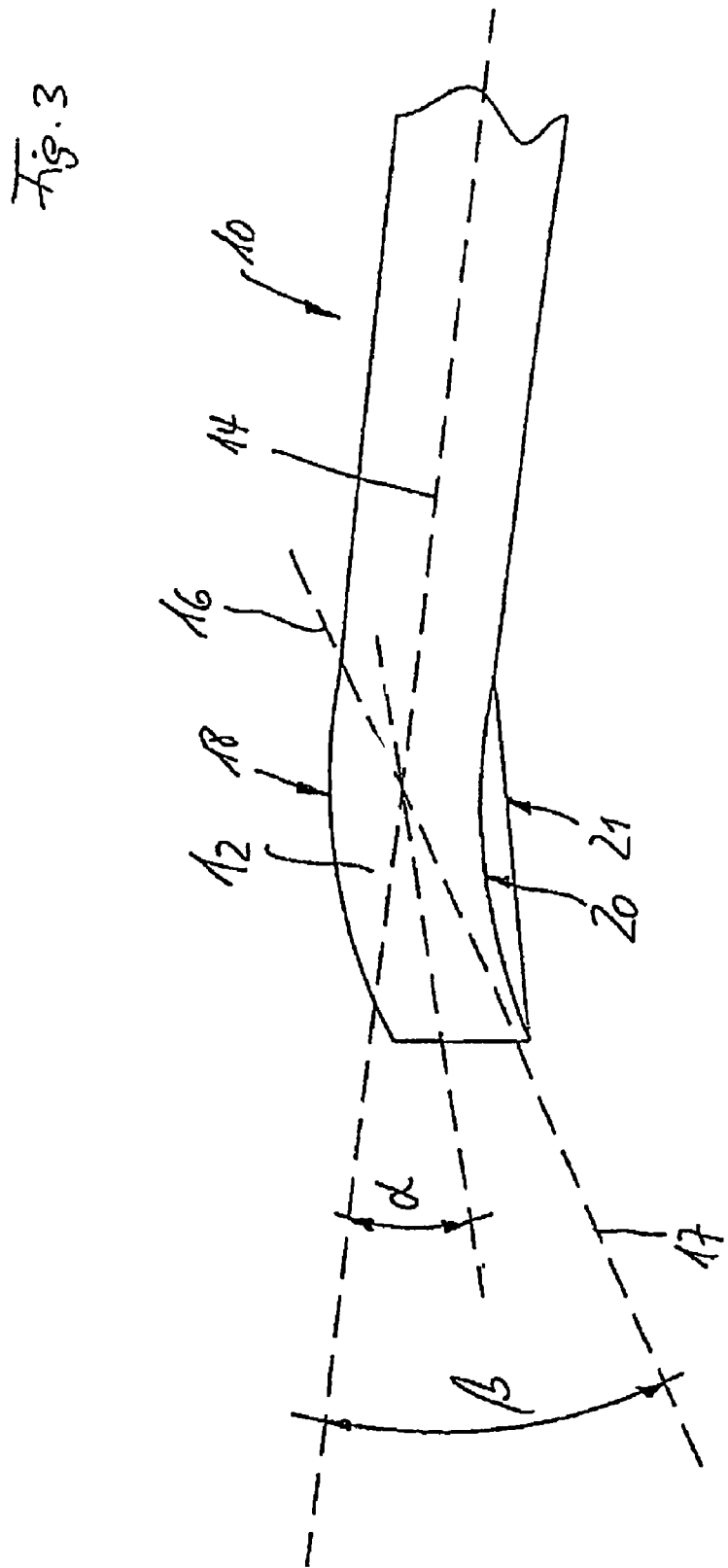

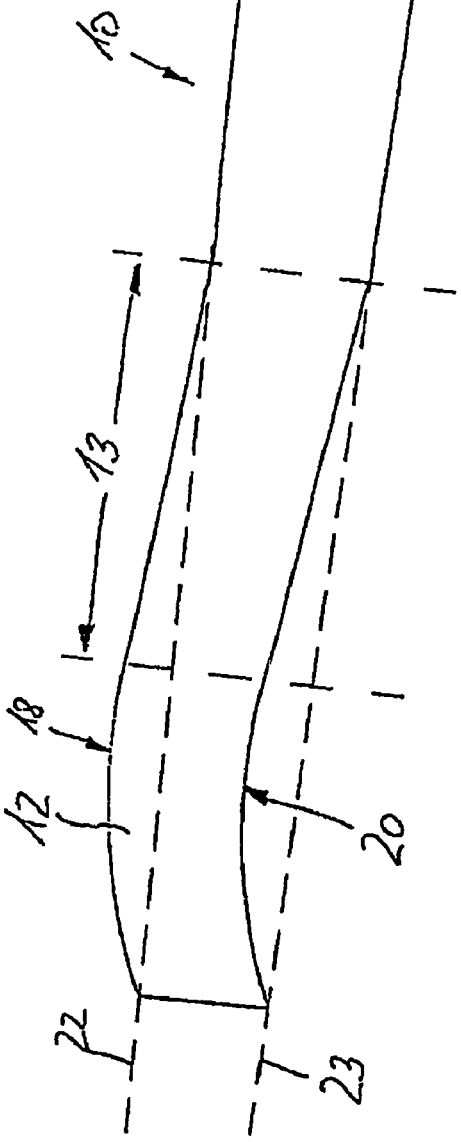

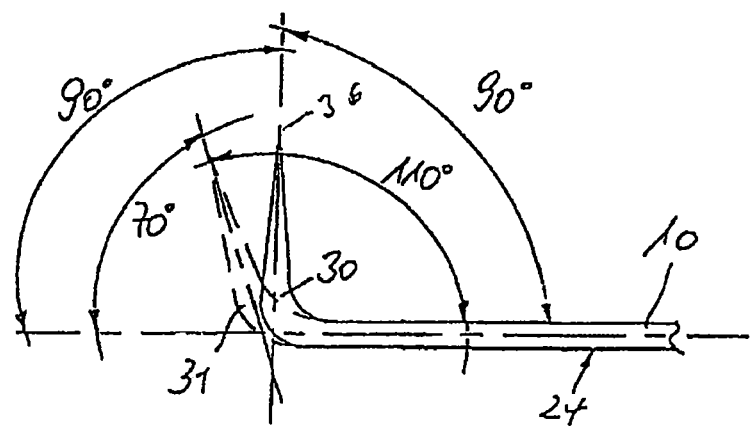
Fig. 6
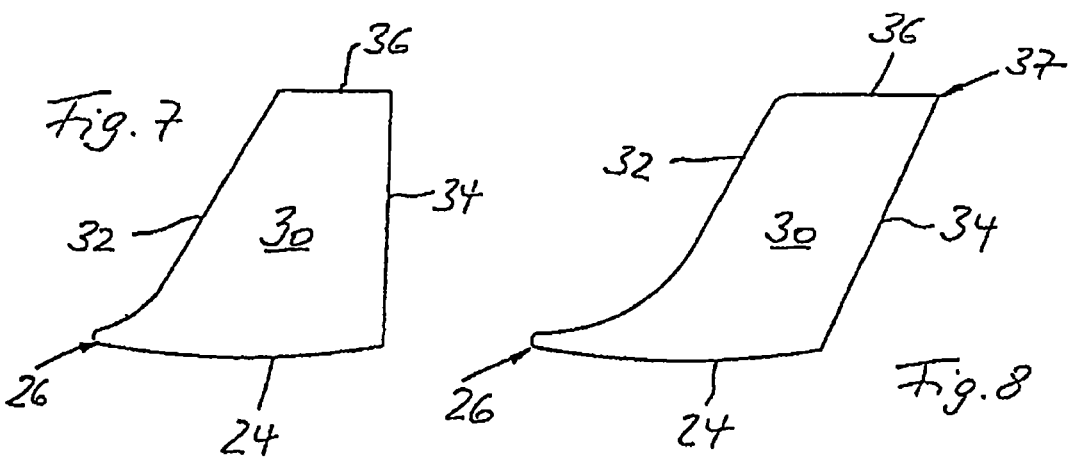
Fig. 7
Fig. 8
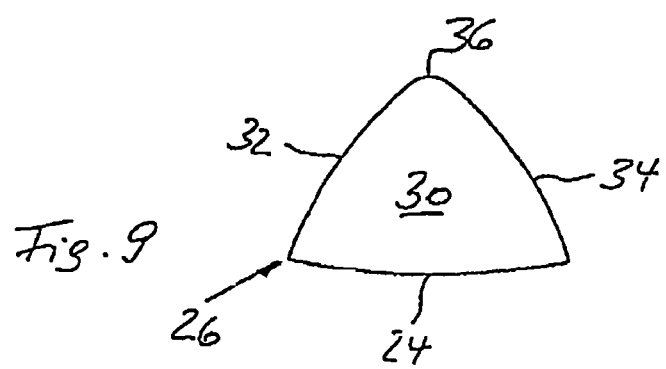
Fig. 9

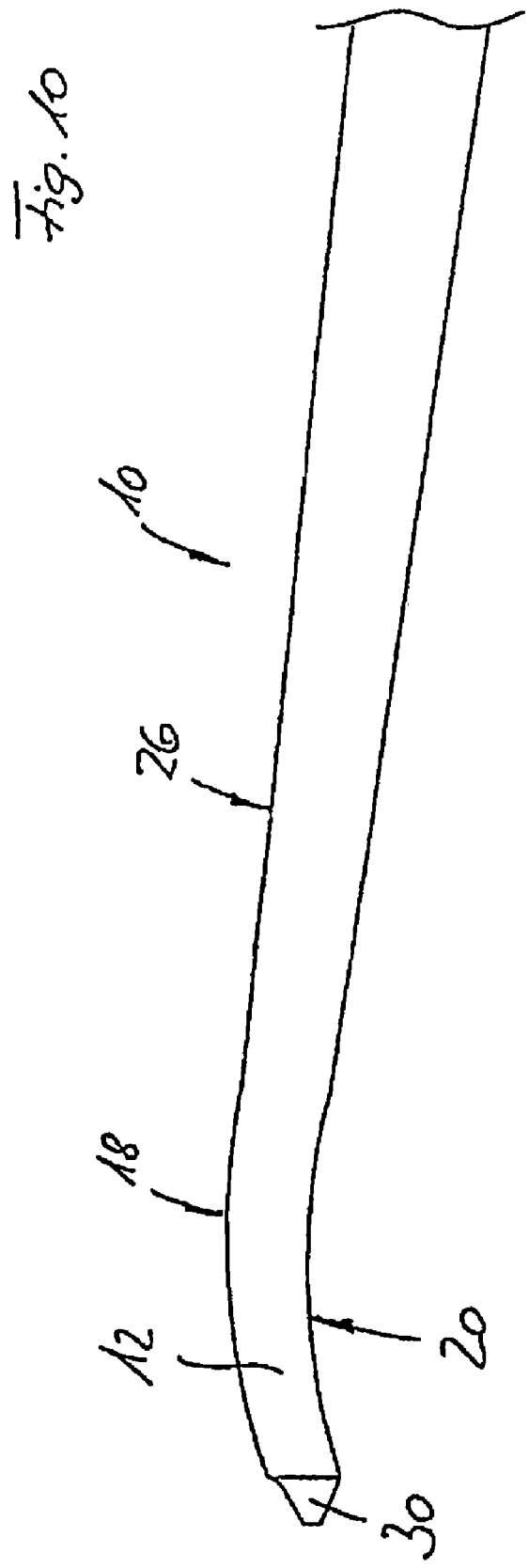

US 8,241,002 B2

ROTOR BLADE FOR A WIND POWER PLANT

FIELD OF THE INVENTION

This application is a continuation application of U.S. patent application Ser. No. 12/268,576, filed Nov. 11, 2008, now U.S. Pat. No. 7,841,836, which is a continuation application of U.S. patent application Ser. No. 10/541,146, filed Apr. 11, 2006 which issued as U.S. Pat. No. 7,540,716 on Jun. 2, 2009, which is a national stage application filed under 35 U.S.C. §371 of International Application No. PCT/EP03/014621, accorded an International Filing Date of Dec. 19, 2003, which claims priority to German Application No. 103 00 284.7, filed Jan. 2, 2003 and German Application No. 103 03 824.8, filed Jan. 31, 2003. Each of these applications is hereby incorporated herein by reference in its entirety.

BACKGROUND OF THE INVENTION

Description of the Related Art

Such rotor blades and rotor blade tips have long been known in the state of the art. In particular curved rotor blade tips have been used for some time for example in rotor blades from the manufacturer Enercon. Those known rotor blade tips are intended to reduce the edge vortices which inevitably occur at the rotor blade end, and thus reduce the occurrence of unwanted noise.

As state of the art attention is directed at this juncture generally to the following publications: DE 197 38 278; DE 197 43 694; DE 44 40 744; DE 196 14 420 and DE 44 36 197.

Rotor blades of the kind set forth in the opening part of this specification are also known, the tips of which terminate elliptically. That configuration of the rotor blade tips is also intended to reduce the levels of noise emission from the rotor blade and in particular the tip thereof.

As wind power plants are now no longer individual phenomena but are to be encountered in many places, they are also increasingly to be found in the proximity of residential areas. It is precisely there that the acceptance of wind power plants is dependent inter alia on the sound emission and it is readily appreciated that quieter wind power plants are accepted more readily than loud ones.

BRIEF SUMMARY OF THE INVENTION

Therefore the object of the present invention is to further reduce the levels of sound emission of wind power plants.

In a rotor blade for a wind power plant of the kind set forth in the opening part of this specification that object is attained in that the rotor blade is curved or angled in its end region in the direction of the trailing edge of the rotor blade in the plane of the rotor blade. In that respect the invention is based on the realization that, in the case of a rotor blade which does not go to a point at the tip, the effective rotor blade area remains unreduced precisely in the outer region in which the effect is greatest. Curving or angling the end region of the rotor blade however means that the trailing edge is displaced rearwardly in the end region of the rotor blade so that the flow at the rotor blade trailing edge is detached in the outer region with a time delay. That also reduces the influence of the vortices which occur upon separation of the flow from the rotor blade trailing edge, with each other, and thus also the sound emission emanating therefrom. It is precisely in the case of a windward rotor that the interaction between the flow around the blade tip and the dynamic air pressure in front of the plant pylon is also reduced by the invention.

In that respect the time delay is dependent on the angle at which the end region extends in relation to the thread axis of the rotor blade. The greater the respective angle, the better is the degree of reduction in noise emission. As on the other hand however torsional moments acting on the rotor blade increase with increasing sweepback, an angle of 1 to 45 degrees, preferably from 1 to 15 degrees, has proven to be advantageous.

In addition, a fluid transition from the rotor blade into the end region is advantageous as, in the case of an abrupt bend, additional pressure fluctuations occur in the region of the bend. They can result in a reduction in power and additional noise.

Preferably in its end region the rotor blade according to the invention involves a predetermined radius of curvature, wherein the curvature particularly preferably increases towards the rotor blade tip, that is to say the radius of curvature becomes less. By virtue of a suitably selected curvature the end region of the rotor blade can be curved mechanically at an angle of about 5 degrees while affording an aerodynamic effect which corresponds to an angle of 10 degrees. That embodies an advantageous acoustic result with at the same time also advantageous aerodynamic characteristics.

At the same time however greater torsional moments occur in the rotor blade due to that sweepback configuration, and those torsional moments also act on the rotor blade connection. Naturally that also results in a permanently higher level of loading on the plant. In order to compensate for that higher level of loading at any event for the rotor blade connection and the subsequent components of the wind power plant, it is particularly advantageous for a central region of the rotor blade, that is to say a region between the rotor blade root and the end region which is swept back in the direction of the trailing edge, to be curved in the direction of the blade leading edge. In that case that curve is of such a dimension that the outer trailing edge of the swept back end region is no deeper than in the case of a blade without a swept back end region.

In that way torsional moments which act in opposite relationship occur in the rotor blade itself and with a suitable design cancel each other out so that the rotor blade itself is admittedly still subjected to that loading but the rotor blade connection and the further components of the wind power plant do not have to carry additional loads.

In order on the one hand to permit easy assembly and on the other retro-fitment to already existing rotor blades, the end region is preferably in the form of a portion which can be fitted into the rotor blade and preferably is of a length of not more than ⅓ of the rotor blade length and particularly preferably about ¹⁄₁₀ of the rotor blade length.

In that case, in an advantageous development, that end region can be hollow and at its end remote from the wake flow can have an opening for water drainage so that fluid which collects in the rotor blade and which is formed for example as a consequence of condensation effects and is transported by centrifugal force to the rotor blade tip can issue from the end region and thus be removed from the rotor blade.

In order to promote the effect of the end region according to the invention, in accordance with the invention there is provided a rotor blade tip for a rotor blade having such an end region, wherein the rotor blade tip is in the form of an independent portion which can be fitted into the end region of the rotor blade.

Alternatively, to obtain the object of the invention, a further development of a rotor blade tip of the kind set forth in the opening part of this specification can be such that the 'outer region' narrows. That configuration for the rotor blade tip is based on the realization that the decreasing blade depth affords a reduced flow around the rotor blade tip as the energy thereof is previously distributed to the trailing edge vortices but at the same time the effective rotor blade area is reduced. The angled configuration of the rotor blade tip means that the effective rotor blade depth remains at its optimum to the angled rotor blade tip.

The region which goes to a point extends at a predetermined preferred angle away from the plane of the rotor blade in the direction of the pressure side of the rotor blade. In that arrangement the vortex at the rotor blade tip is simultaneously detached from the rotor blade plane and moved into another plane. That in turn has a favorable effect on sound emission of the rotor blade equipped with such a tip and at the same time reduces losses which occur at the rotor blade. That involves both the edge vortex losses and the degree of aerodynamic efficiency which can be improved by a suitable design, as well as an advantageous configuration in respect of the pressure drop between the pressure and the suction sides.

In a particularly preferred feature the outer region of the rotor blade tip is curved out of the horizontal at an angle of about 70° to 90° out of the horizontal. In other words, the rotor blade tip includes an angle of about 110° to 90° with the rotor blade. In empirical investigations, the best results have been found with those angles.

In a particularly preferred development the rotor blade tip according to the invention is in the form of an independent portion which can be fitted into the rotor blade. In addition the rotor blade tip is hollow and preferably comprises metal, in particular aluminium. The hollow structure affords a reduction in weight and thus greater ease of handling.

In addition a hollow rotor blade tip, like also a hollow end region of a rotor blade as described hereinbefore, can have warm air flowing therethrough, for example for eliminating or reducing icing.

In addition a rotor blade tip made from metal can serve as a lightning conductor and thus transfer lightning strikes into a suitable lightning arrester in order thereby to effectively protect the wind power plant in the event of a lightning strike.

Advantageous developments of the invention are set forth in the appendant claims.

BRIEF DESCRIPTION OF THE SEVERAL VIEWS OF THE DRAWINGS

The invention is described in greater detail hereinafter with reference to the Figures in which:

FIG. 1 shows a plan view of a rotor blade according to the invention with a curved end region according to a first embodiment of the invention, FIG. 2 shows a rotor blade according to the invention with a curved end region according to a second preferred embodiment of the invention, FIG. 3 shows a further view of the second embodiment of the invention, FIG. 4 shows still a further view of the second embodiment, FIG. 5 shows a third embodiment of a swept back rotor blade, FIG. 6 shows a side view of a rotor blade tip according to the invention, FIG. 7 shows a front view of an embodiment of a rotor blade tip according to the invention, FIG. 8 shows a front view of an alternative embodiment of a rotor blade tip according to the invention, FIG. 9 shows a front view of an alternative embodiment of a rotor blade tip according to the invention, and FIG. 10 is a view of a rotor blade with the end region designed in accordance with the invention and a rotor blade tip according to the invention.

DETAILED DESCRIPTION OF THE INVENTION

FIG. 1 shows a rotor blade 10 having a leading edge 18 and a trailing edge 20 according to the invention of a wind power plant. The thread axis 14 is indicated in the rotor blade 10. The thread axis 14 is a notional axis on to which all parts of a rotor blade are to be threaded so as to afford the desired rotor blade shape.

The end region 12 of the rotor blade 10 is bent at a predetermined angle α with respect to a first thread axis 14. A second thread axis 16 is illustrated for the end region 12, the angle α being specified between the two axes 14, 16. In this Figure the angle α is 5 degrees. That value represents an acceptable compromise between reduced sound emission and increased loading.

Therefore the end region is bent in the rotor blade plane in the direction of the rotor blade trailing edge 20. That bend results on the one hand in a longer trailing edge and thus a wider distribution of the vortex energy. On the other hand the flow breaks away at the trailing edge of the rotor blade 10 in the bent end region 12, later than in the straight region of the rotor blade 10. As a result the noise-generating vortices occur correspondingly later.

An improved embodiment of a rotor blade 10 according to the invention is shown in FIG. 2. This Figure also shows the thread axes 14, 16. It will be noted however that the transition from the rotor blade 10 into the end region 12 does not occur here at a sharp bend but rather extends steadily in the form of a curvature. It will be noted that the curvature increases towards the rotor blade tip. The radius of curvature therefore becomes smaller towards the rotor blade tip.

In this case, in the end region 12 the arc tangent is displaced in parallel relationship at the tip of the rotor blade trailing edge 20 and towards the center of the rotor blade. An angle β is defined between the axes 14, 16. That angle is 10 degrees.

Those 10 degrees occur precisely out of the configuration of the arc tangent at the rotor blade tip, in which respect however the provided sweepback of the rotor blade 10 is not greater than in the case of the rotor blade 10 shown in FIG. 1. Accordingly the aerodynamic characteristics differ only slightly from the rotor blade shown in FIG. 1 while however the acoustic characteristics are better by virtue of the greater angle β.

That situation as set forth hereinbefore is described in greater detail with reference to FIG. 3. In particular the end region 12 of the rotor blade 10 is shown in FIG. 3. The trailing edge of the end region 12 in this case is shown bent on the one hand in a manner corresponding to the embodiment illustrated in FIG. 1. That variant is denoted by reference numeral 21. At the same time the embodiment with the curved trailing edge 20 is also illustrated.

It can be clearly seen here that the outermost rotor blade tip at the trailing edges 20 and 21 each occur at the same point; the rotor blade depth is therefore unchanged from the aerodynamic point of view.

This Figure also shows the first thread axis 14 (original blade thread axis). The arc tangent 17 which has been displaced in parallel relationship and the second thread axis 16 (tip thread axis) corresponding to the trailing edge 21 of the end region are also shown. The angles α and β are also illustrated. The angle α is again 5 degrees. It is formed by the first thread axis 14 of the rotor blade 10 and the second thread axis 16 corresponding to the embodiment of the rotor blade as shown in FIG. 1. The angle β is enclosed between the first thread axis 14 and the arc tangent 17 corresponding to the embodiment shown in FIG. 2. The angle β is 10 degrees.

Here therefore it is particularly easy to see the advantage of the embodiment illustrated in FIG. 2.

FIG. 4 shows once again the swept back rotor blade 10 according to the invention with the leading edge 18, the trailing edge 20 and the end region 12 which is swept back in the direction of the trailing edge 20. Also shown in this Figure are two lines 22, 23 representing the configuration of the leading edge 18 and the trailing edge 20 without the swept back end region 12. This Figure already clearly shows the extent to which the end region 12 is swept back by virtue of the sweepback in the direction of the trailing edge of the rotor blade 10.

FIG. 5 shows an alternative embodiment of the rotor blade 10 according to the invention which differs from the embodiment illustrated in FIG. 4 by a central portion 13 which is swept in the direction of the leading edge 18 of the rotor blade 10. It will be appreciated that the advantage of the fluid transition between the individual regions of the rotor blade 10 also applies in regard to that swept configuration. In this respect that sweep in the direction of the leading edge 18 is of such a magnitude that the outermost point of the end region 12 of the rotor blade, which is swept back in the direction of the trailing edge 20, is again within the broken lines 22 which in this Figure also specify the notional rectilinear configuration of the rotor blade.

That arrangement results in mutually oppositely acting torsional moments in the end region 12 and the central region 13 of the rotor blade, which cancel each other out when suitably dimensioned in terms of their action at the rotor blade connection.

FIG. 6 shows a rotor blade 10 with an edge arc 30 according to the invention, which extends away from the suction side 24 of the rotor blade 10, that is to say towards the pressure side of the rotor blade 10. The upper edge 36 of the edge arc 30 is of a profile thickness which is as small as possible in order to minimize as far as possible the edge vortices which are detached there, so that a level of sound emission which is also as low as possible is involved.

The edge arc 30 is preferably bent out of the horizontal at an angle of about 60° to 90°. In other words, it includes an angle of between 120° and 90° with the rotor blade. That region is illustrated by two upwardly bent portions 30, 31 of which one is shown by a broken line.

FIG. 7 shows a front view of a first embodiment of the edge arc 30 according to the invention. In this Figure the trailing edge 34 of the edge arc 30 and the upper edge 36 of the edge arc extend rectilinearly while the front edge 32 between the rotor blade leading edge 26 and the edge arc upper edge 36 extends away from the suction side 24 of the rotor blade at a predetermined angle. That arrangement provides that the edge arc upper edge 36 is shortened in relation to the depth of the rotor blade, as can be seen at the rotor blade suction side 24. The rotor blade therefore involves its aerodynamically fully effective depth as far as the edge arc 30 and it is only in the edge arc 30 that it goes into a shorter edge arc upper edge 36.

At the same time the edge vortex which tears away at the rotor blade upper edge 36 is guided out of the plane of the rotor blade 10 so that the edge vortex is guided away from the plane of the blade.

FIG. 8 shows an alternative embodiment of the edge arc shown in FIG. 7. While FIG. 7 shows an arc edge trailing edge 34 which extends substantially perpendicularly to the longitudinal axis of the rotor blade, that edge arc is also swept in the direction of the trailing edge 34 in FIG. 8. That sweep configuration provides that the detachment point 37 at which the flow becomes detached from that edge arc is displaced still further rearwardly and accordingly the energy of the edge vortices is still further distributed and the level of sound emission is still further reduced.

The operating principle is similar in the embodiment of the edge arc 30 shown in FIG. 9. It will be noted that this edge arc 30 is optimized to afford an edge vortex which is as small as possible. For that purpose the edge arc leading edge 32 and the edge arc trailing edge 34 extend with a predetermined curved and particularly preferably elliptical gradient to the edge arc upper edge 36. In that case the edge arc upper edge 36 is again bent away from the rotor blade suction side 24, that is to say towards the pressure side, out of the plane of the rotor blade.

The elliptical configuration of the edge arc leading edge 32 and the edge arc trailing edge 34 at the same time increases the length of the distance over which the flow separates from the rotor blade. That also results in a reduced level of sound emission as a flow around the blade tip is very substantially eliminated, unlike the situation with blade geometries which terminate in a blunt shape.

The ratio of depth to height (the depth is the width in the plan view in FIG. 9) of the angled portion of the arc edge is about 1:0.8 to 1.2, preferably 1:1. The ratio of the height of the angled portion of the edge arc to the depth of the rotor blade at the connection of the edge arc is about 1:1 to 1:1.3, preferably 1:1.14. In that respect the depth configuration in the angled portion of the edge arc is approximately hyperbolic (the profile width in a plan view) and the uppermost cap point of the outermost profile section is at about 30 to 40%, preferably 33% of the profile depth, with respect to the thread axis of the blade.

FIG. 10 shows a rotor blade 10 with a combination of a curved end region 12 and an edge arc 30 adjoining same. In this case the curve of the edge region 12 from the leading edge 26 of the rotor blade to the trailing edge 20 and a curve of the edge arc 30 out of the plane of the rotor blade can be clearly seen. Accordingly the advantageous acoustic effects of the curved end region 12 on the one hand and the angled edge arc 30 on the other hand are combined here.

The described rotor blade according to the invention is part of a rotor of a wind power plant.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A wind power plant rotor blade comprising a main rotor body and a tip, the tip extending away from a plane of the main rotor body and in a direction of at least one of a low pressure side or a high pressure side of the main rotor body, the tip including a tip upper edge, a tip leading edge, and a tip trailing edge, at least a portion of the tip leading edge having a concave shape and a width of the tip defined between the tip leading edge and the tip trailing edge is reduced towards the tip upper edge.

2. The wind power plant rotor blade of claim 1, wherein the tip leading edge includes a lower edge portion proximate to the main rotor body and an upper edge portion proximate to the tip upper edge, the lower edge portion has an arcuate shape.

3. The wind power plant rotor blade of claim 2, wherein the upper edge portion is a substantially straight.

4. The wind power plant rotor blade of claim 1, wherein the width of the tip decreases towards the tip upper edge with respect to a longitudinal axis of the tip.

5. The wind power plant rotor blade of claim 1, wherein the tip extends in the direction of the high pressure side of the main body.

6. The wind power plant rotor blade of claim 1, wherein the tip and the plane of the main rotor body define an angle in a range of about 90 degrees to about 110 degrees.

7. The wind power plant rotor blade of claim 1, wherein the tip trailing edge extends substantially perpendicular to the plane of the main rotor body, the plane of the main rotor body is an imaginary plane in which a trailing edge of the main rotor body and a leading edge of the main rotor body lie.

8. The wind power plant rotor blade of claim 1, wherein the tip is swept rearwardly relative to the main rotor body.

9. The wind power plant rotor blade of claim 8, wherein the tip trailing edge extends rearwardly of a portion of the main rotor body adjacent to the tip.

10. The wind power plant rotor blade of claim 1, wherein a length of the tip leading edge is greater than a length of the tip trailing edge.

11. A wind power plant rotor blade comprising a main rotor body and a rearwardly swept tip extending away from a plane of the main rotor body, the tip including a tip upper edge, a tip leading edge, and a tip trailing edge, wherein at least a portion of the tip leading edge has a concave shape.

12. The wind power plant rotor blade of claim 11, wherein a span of the tip decreases towards the tip upper edge.

13. The wind power plant rotor blade of claim 11, wherein the tip has a non-linearly varying chord length relative to a longitudinal length of the tip.

* * * * *